May 23, 1961     C. H. TRACY     2,984,883
FASTENING DEVICE
Filed July 6, 1959
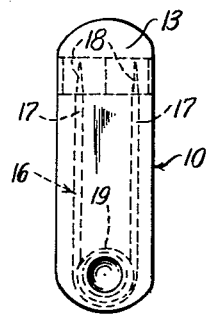
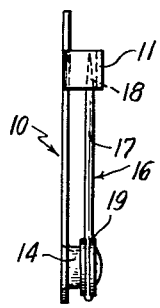
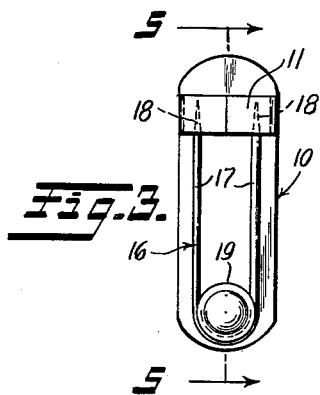
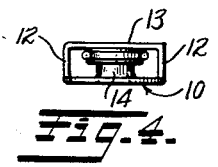
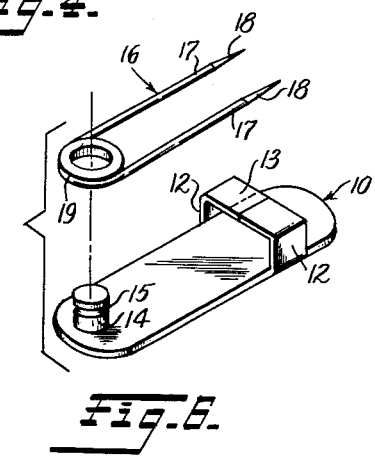
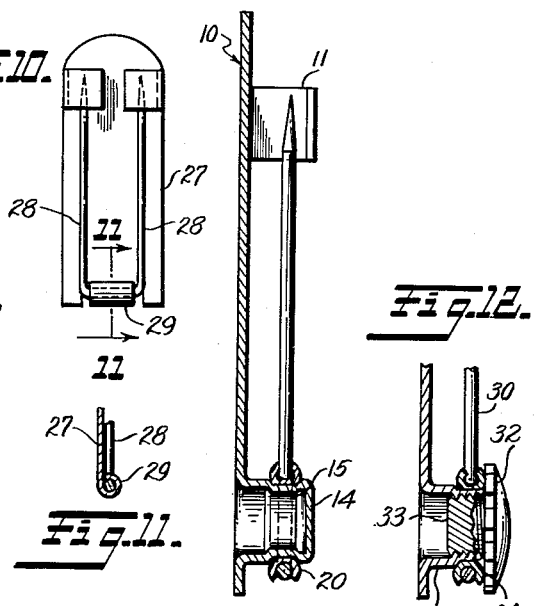
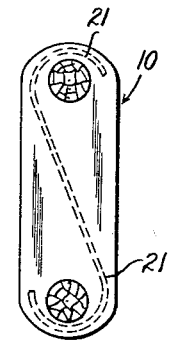
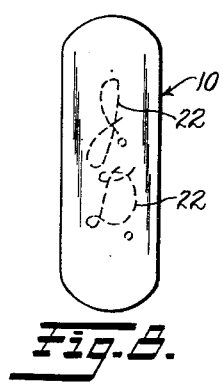
INVENTOR.
*Charles H. Tracy*
BY
*Holcombe, Wetherill & Brisebois*
ATTORNEYS

United States Patent Office 2,984,883
Patented May 23, 1961

2,984,883

FASTENING DEVICE

Charles H. Tracy, 2525 Applegate St.,
Klamath Falls, Oreg.

Filed July 6, 1959, Ser. No. 825,287

1 Claim. (Cl. 24—156)

This invention relates to a fastening device, and more in particular to a pin having two arms which are retained within a keeper at one end of the pin.

Heretofore safety pins have been made with one arm sharpened at one end which is retained within the keeper by means of the spring tension of the arm. This has not proven satisfactory as the arm sometimes becomes bent and the spring tension is thereby removed and the pin is displaced from the clothing.

It is an object of the present invention to provide a safety pin having two arms so as to obtain a double grip on the clothing.

It is another object of this invention to provide a safety pin having a closed keeper so that the points may not be accidentally removed therefrom.

It is a still further object of this invention to provide a releasable means of mounting the arms on the body of the pin.

The various features of novelty which characterize this invention are pointed out with particularity in the claim annexed to and forming part of this specification. For a better understanding of the invention, however, its advantages and specific objects attained with its use, reference should be had to the accompanying drawings and descriptive matter in which has been illustrated and described a preferred embodiment of the invention.

In the drawings:

Figure 1 is a front elevational view of the pin of the present invention.

Fig. 2 is a side elevation as viewed from the right of Figure 1.

Fig. 3 is a rear elevational view of the pin.

Fig. 4 is a top plan view of the pin.

Fig. 5 is an enlarged sectional view substantially on line 5—5 of Fig. 4.

Fig. 6 is an exploded isometric view of the pin.

Fig. 7 is a front elevational view similar to Figure 1 illustrating in dotted lines a design which may be employed.

Fig. 8 is a front elevational view similar to Figure 7 illustrating another design which may be employed.

Fig. 9 is a top plan view of a modified form of keeper.

Fig. 10 is a plan view of a modification of the pin assembly using the keeper shown in Fig. 9.

Fig. 11 is a sectional view on line 11—11 of Fig. 10.

Fig. 12 is an enlarged fragmentary sectional view similar to Fig. 5, showing a modification of assembling the double pointed pin by means of an ordinary thumb screw.

The improved safety pin shown in the drawings comprises a body portion 10 shown in Fig. 1, which may be flat as shown, or may be curved to suit the specific conditions under which the pin will be used. At the upper end of the pin is a keeper 11 which comprises two side portions 12, 12, shown in Fig. 4, rising from the body and top piece 13. This top piece with the side pieces and the body form a box like structure, particularly illustrated in Fig. 6.

At the other end of the body portion is a stud 14 rigidly mounted on the body and having a circumferential groove 15 thereon intermediate its ends to receive and releasably retain the pin portion to be later described. The pin portion 16 comprises two arms 17, 17 having pointed ends 18, 18 thereon. These arms are made by deforming a piece of resilient metal to form a loop 19 at the end opposite from the pins 18, 18. This loop is of such size that it may be forced over the stud 14 and be received by and held in the groove 15 in a releasable manner. The loop part of the portion 19 of the pin has a flat spring between the arms 17, 17 to form a snap socket that will fit the stud 14 from either side of the loop 19.

The body portion of the pin, as stated above, may be flat or it may be curved or rounded as required by the use to which the pin is going to be placed, or it may be decorated, as shown in Figures 7 and 8, having a design 21 thereon, or initials 22, 22 engraved therein.

In the above preferred embodiment of this invention the keeper is a box like structure being closed across the top. An alternate form is illustrated in Fig. 9 and constitutes the second embodiment of this invention. This keeper has the body portion 23, the two side portions 24, 24 and two top portions 25, 25 with the edges of the top portion returned towards the body portion so as to form two keepers with an opening 26 between the returned edge of the body portion, the opening 26 being just sufficient to allow one of the points of the pin to pass thereunder.

An alternate form of fastening the pins is illustrated in Figs. 10 and 11. The body portion 27 has the pins 28, 28 attached thereto by means of the returned part 29 of the body portion containing and holding the loop portion of the pins 28, 28. This is shown in Fig. 11 in section and illustrates an alternate form of mounting the pin on the body. An open keeper such as illustrated in Fig. 9 must be used with this type of mounting.

While in Figs. 1 to 5 inclusive have been illustrated a snap method of mounting the pin on the stud an alternate form of mounting this pin on the stud is illustrated in Fig. 12 wherein the pin 30 is passed over the stud 31 and is retained thereon by means of the screw cap 32 which has a threaded boss 33 on the under side thereof, which is received and retained by the threads 34 on the interior part of the stud.

In use the pin portion 16 is separated from the body of the pin and inserted in the cloth or other materials to be held in place. The points of the pin are then inserted under the keeper 11 and the loop 19 is forced over the stud 14 until it is received in and retained by the groove 15. This snap action retains the pin in position in a positive manner until the pin is forced from the stud, at which time the pin may be removed from the body portion and the pin itself removed from the clothing. This allows a positive holding action on the part of two pins and prevents the pins from tearing from the cloth and the strain on the pin is equally divided between two restraining pin members and will not therefore tear the cloth with the same amount of force as if a single pin were used. The device shown in Fig. 12 may be used in a similar manner. The pins 30 are passed through the cloth, and then the body portion with the stud 31 on one end having a keeper (not shown) on the other end, which keeper is of the same type as that shown in Fig. 6, is brought into contact with the pin having the points inserted under the keeper and the pin portion passed over the stud. The screw cap 32 is then screwed into the stud 31 and holds the pin in position.

The alternate form of the pin portion, shown in Figs. 10 and 11 may be used as described above, the pins are removed from under the keeper, which is the type shown in Fig. 9, and inserted through the cloth and then are forced under the keeper to retain the pin in position.

While in accordance with the provisions of the statute there has been illustrated and described the best form of embodiment of this invention now known, it will be apparent to those skilled in the art that changes may be made in the form of the apparatus disclosed without departing from the spirit of this invention as set forth in the appended claim, and that in some cases certain features of this invention may be used to advantage without a corresponding use of other features.

What is claimed is:

A fastening device comprising a body portion and a pin portion, said body portion having a structurally integral keeper at one end and a stud at the other end, said keeper comprising two upstanding portions and a closed top portion, said stud having a circumferential groove thereon intermediate its ends to receive and frictionally retain the pin portion in a closed position, said pin portion comprising two substantially parallel arms which are pointed at one end, said point being received by said keeper in said closed position, and having means at the other end to frictionally engage and be releasably retained by said groove in said stud.

References Cited in the file of this patent

UNITED STATES PATENTS

| | | |
|---|---|---|
| 892,752 | Malings | July 1908 |
| 896,214 | King | Aug. 18, 1908 |
| 1,336,692 | Forman | Apr. 13, 1920 |
| 1,357,918 | Wheeler | Nov. 2, 1920 |
| 1,645,128 | Craddock | Oct. 11, 1927 |
| 2,635,311 | Schaffer | Apr. 21, 1953 |